(12) United States Patent
Gorokhov et al.

(10) Patent No.: US 8,265,562 B2
(45) Date of Patent: Sep. 11, 2012

(54) METHOD AND SYSTEM TO INDICATE A DESIRED TRANSMIT POWER AND SOFT POWER CONTROL IN A WIRELESS NETWORK

(75) Inventors: Alexei Y. Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 12/400,383

(22) Filed: Mar. 9, 2009

(65) Prior Publication Data
US 2010/0061317 A1  Mar. 11, 2010

Related U.S. Application Data

(60) Provisional application No. 61/035,979, filed on Mar. 12, 2008.

(51) Int. Cl.
*H04B 1/00* (2006.01)
*H04B 15/00* (2006.01)
(52) U.S. Cl. .............. 455/63.1; 455/67.13; 455/501
(58) Field of Classification Search .............. None
See application file for complete search history.

(56) References Cited

U.S. PATENT DOCUMENTS

| 2007/0060057 A1* | 3/2007 | Matsuo et al. ............ 455/63.1 |
| 2007/0258403 A1 | 11/2007 | Hulbert |
| 2010/0159841 A1* | 6/2010 | Barberis et al. .......... 455/67.11 |

FOREIGN PATENT DOCUMENTS

| WO | WO2007112141 | 10/2007 |
| WO | WO2009064582 A2 | 5/2009 |

OTHER PUBLICATIONS

International Search Report and Written Opinion—PCT/US2009/036853—ISA/EPO—Oct. 6, 2009.

* cited by examiner

*Primary Examiner* — Anh Tran
(74) *Attorney, Agent, or Firm* — Florin Corie; Peter A. Clevenger

(57) ABSTRACT

In a wireless communication system, short-term interference mitigation may be used to mitigate (e.g., to avoid or reduce) interference on a given link in order to improve performance of data transmission. The interference mitigation reduces transmit power of interfering transmissions so that a higher signal-to-noise-and-interference ratio (SINR) can be achieved for a desired data transmission. A node may observe high interference from an interfering node that degrades performance of data transmission sent on that link. By taking advantage of an communication path with the interfering node (e.g., wireless data/control channel, backhaul network connection, or analog broadcast signal), the transmitting node can successfully complete time critical communications while allowing the interfering node to also simultaneously communicate without reducing overall resources nor burdening any managing nodes.

70 Claims, 10 Drawing Sheets

METHOD AND SYSTEM TO INDICATE A DESIRED TRANSMIT POWER AND SOFT POWER CONTROL IN A WIRELESS NETWORK

CLAIM OF PRIORITY UNDER 35 U.S.C. §119

The present Application for Patent claims priority to Provisional Application No. 61/035,979 entitled "METHOD AND SYSTEM TO INDICATE A DESIRED TRANSMIT POWER AND SOFT POWER CONTROL IN A WIRELESS NETWORK" filed Mar. 12, 2008, assigned to the assignee hereof and hereby expressly incorporated by reference herein.

BACKGROUND

1. Field

The present disclosure relates generally to wireless communications, and more specifically but not exclusively to various algorithms for interference management messaging in a wireless network.

2. Background

Wireless networks are widely deployed to provide various services to consumers, such as telephony, data, video, audio, messaging, broadcasts, etc. Wireless networks enable broadband communications over a regional, nationwide, or even global region. Such networks are sometimes referred as Wireless Wide Area Networks (WWANs). One common example of a WWAN is a cellular network that supports CDMA2000, a telecommunications standard that uses Code Division Multiple Access (CDMA) to send voice, data, and signaling between mobile subscribers. Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards. Other examples include WCDMA, HSPA and LTE. These cellular networks generally provide coverage over multiple cellular regions, with a fixed-site base station located in each cell to serve mobile subscribers.

Smaller wireless networks known as Wireless Local Area Networks (WLANs) have been standardized, for example by the IEEE 802.11 committee. WLANs are deployed to cover small areas with a geographic coverage ranging from a few tens of meters to a few hundred meters. A WLAN uses unlicensed spectrum to provide access to a network, typically covering only the network operator's own property. By way of example, many coffee shops, hotels, and transportation hubs contain WLAN access points to the Internet.

Wireless systems deployed within such wireless networks always appear to suffer from interference issues. For example, a node A wishing to receive signals from a node B may experience interference from a third node C within the network. One proposed solution involves interference avoidance mechanisms. In such cases, node A may request node C to not transmit in a certain time slot or a certain frequency band or both. If node C and other such interferers obey this request, node A can receive information from node C.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with One of the perceived disadvantages of such a scheme relates to the inefficient utilization of bandwidth. In the above example, node C does not transmit anything whenever node A wishes to communicate with node B. It is, however, possible that node C may simply lower its transmit power and thereby decrease the interference caused to node A. The lower interference level may suffice for node A to receive the signal from node B at a desired quality.

In one aspect, a method is provided for wireless communication by detecting interference from an interfering node, signaling a request received by the interfering node to transmit at a power level so as to achieve a desired interference level, and wirelessly transmitting data packet communication to a receiving node.

In another aspect, at least one processor is provided for wireless communication. A first module signals a request received by the interfering node to transmit at a power level so as to achieve a desired interference level. A second module wirelessly transmits data packet communication to a receiving node.

In an additional aspect, a computer program product is provided for wireless communication. A computer-readable storage medium comprises a first set of codes for causing a computer to signal a request received by the interfering node to transmit at a power level so as to achieve a desired interference level. A second set of codes causes the computer to wirelessly transmit data packet communication to a receiving node.

In another additional aspect, an apparatus is provided for wireless communication. Means are provided for signaling a request received by the interfering node to transmit at a power level so as to achieve a desired interference level. Means are provided for wirelessly transmitting data packet communication to a receiving node.

In a further aspect, an apparatus is provided for wireless communication. A computing platform determines signaling a request received by an interfering node to transmit at a power level so as to achieve a desired interference level. A transmitter wirelessly transmits data packet communication to a receiving node.

In yet one aspect, a method is provided for wireless communication by receiving a request from a second node for reducing transmit power to a third-party node that is interfering with a transmission by the second node, and reducing transmission power in accordance with a requested power level.

In yet another aspect, at least one processor is provided for wireless communication. A first module receives a request from a second node for reducing transmit power to a third-party node that is interfering with a transmission by the second node. A second module reduces transmission power in accordance with a requested power level.

In yet an additional aspect, a computer program product is provided for wireless communication. A computer-readable storage medium comprises a first set of codes for causing a computer to receive a request from a second node for reducing transmit power to a third-party node that is interfering with a transmission by the second node. A second set of codes causes the computer to reduce transmission power in accordance with a requested power level.

In yet another additional aspect, an apparatus is provided for wireless communication. Means are provided for receiving a request from a second node for reducing transmit power to a third-party node that is interfering with a transmission by the second node. Means are provided for reducing transmission power in accordance with a requested power level.

In yet a further aspect, an apparatus is provided for wireless communication. A receiver receives a request from a second node for reducing transmit power to a third-party node that is interfering with a transmission by the second node. A computing platform reduces transmission power in accordance with a requested power level.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
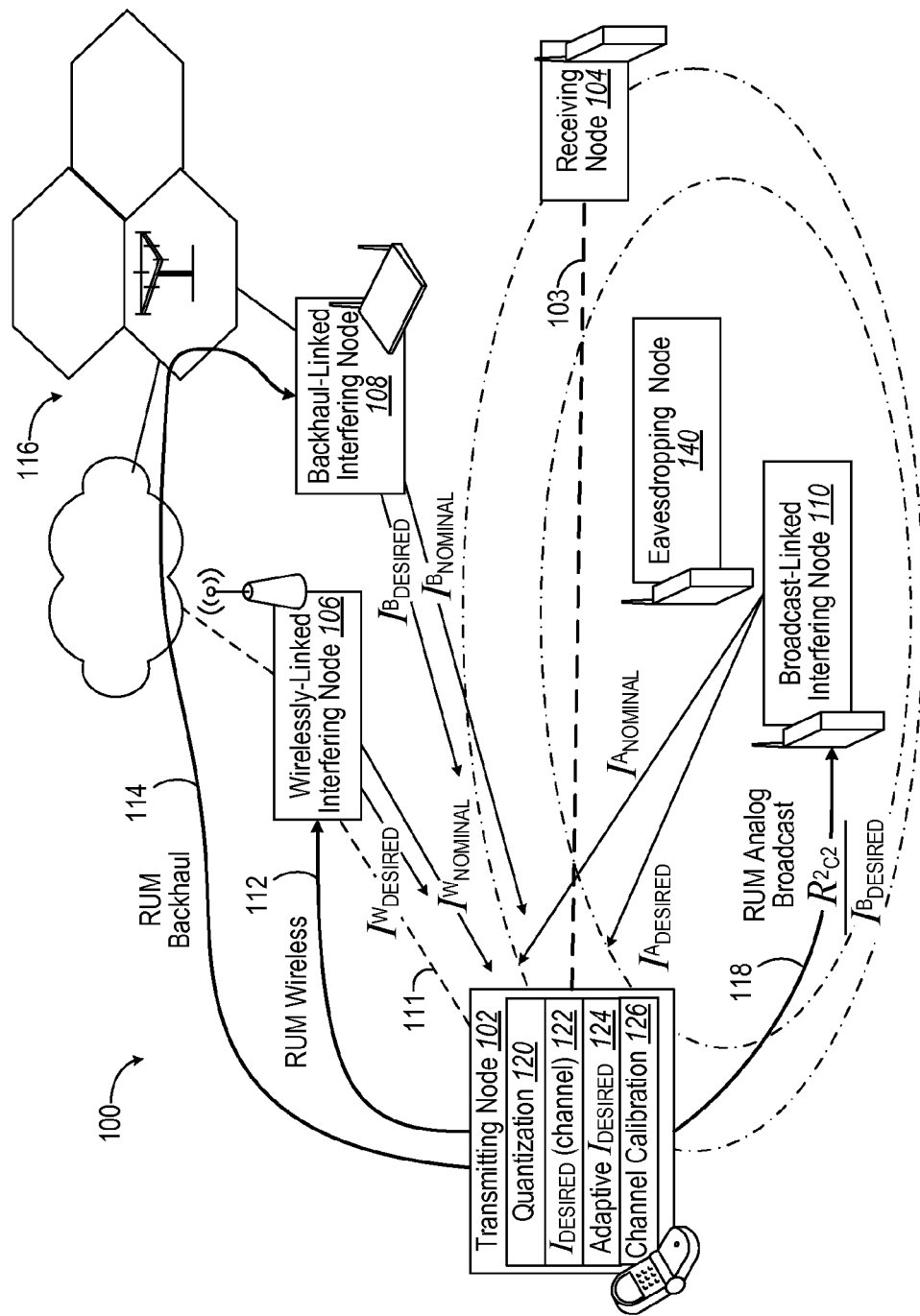
FIG. 1 depicts a block diagram of a wireless communication system with a transmitting node wirelessly transmitting in the presence of interfering node.

In one particular exemplary use in a heterogeneous network, a terminal may communicate with a serving base station on the forward and/or reverse link. On the forward link, the terminal may observe high interference from an interfering base station. This may be the case, e.g., if the serving base station covers a pico cell or a femtocell and has much lower transmit power than the interfering base station. On the reverse link, the serving base station may observe high interference from an interfering terminal The interference on each link may degrade performance of data transmission sent on that link. The interference mitigation may also steer the interfering transmission away from a station observing high interference.

In an aspect, short-term interference mitigation may be used to mitigate (e.g., to avoid or reduce) interference on a given link in order to improve performance of data transmission. The interference mitigation reduces transmit power of interfering transmissions so that a higher signal-to-noise-and-interference ratio (SINR) can be achieved for a desired data transmission.

A wireless communication system may include a number of base stations and other network entities. A base station may be a fixed station that communicates with the terminals and may also be referred to as an access point, a Node B, an evolved Node B, etc. Each base station may provide communication coverage for a particular geographic area. The term "cell" can refer to a coverage area of a base station and/or a base station subsystem serving this coverage area, depending on the context in which the term is used. A base station may provide communication coverage for a macro cell, a pico cell, a femtocell, and/or other types of cell. A macro cell may cover a relatively large geographic area (e.g., several kilometers in radius) and may support communication for all terminals with service subscription in the system. A pico cell may cover a relatively small geographic area and may support communication for all terminals with service subscription. A femtocell may cover a relatively small geographic area (e.g., a home) and may support communication for a set of terminals having association with the femtocell (e.g., terminals belonging to residents of the home). The terminals supported by a femtocell may belong in a closed subscriber group (CSG). The techniques described herein may be used for all types of cell.

Terminals may be dispersed throughout the system, and each terminal may be stationary or mobile. A terminal may also be referred to as an access terminal, a mobile station, user equipment, a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a serving base station and may cause interference to and/or receive interference from one or more interfering base stations. A serving base station is a base station designated to serve a terminal on the forward and/or reverse link. An interfering base station is a base station causing interference to a terminal on the forward link. An interfering terminal is a terminal causing interference to a base station on the reverse link.

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Referring now to the drawings, in FIG. 1, a wireless communication system 100 facilitates a transmitting node (or Node A as used herein) 102 transmitting time critical data packet communication successfully as depicted at 103 to a receiving node (or Node B as used herein) 104 by requesting that an interfering node(s) (or Node C as used herein) 106, 108, 110 reduce its transmit power. If a lower power level can enable both the transmitting node 102 and interfering node 106, 108, 110 to continue, then over-the-air resources are preserved and time critical communications are successfully completed. In one aspect, a node can choose not to transmit if its power falls below a certain minimum level.

In an illustrative example, the wireless communication system 100 is heterogeneous in that different classes (i.e., different maximum transmit power levels) of nodes (e.g., femtocell, macro cell, relay terminal, pico cell, access terminal, base station, access point, etc.) are in proximity to one another (i.e., can create interference for one another). One node 104, depicted as an access point, serves the transmitting node 102, which is depicted as an access terminal (AT) or user equipment (UE), and thus is in close wireless communication as depicted at 111 that enables resource utilization messaging (RUM) via a wireless data or control channel 112. By contrast, an interfering node 108 can be a high power node for which the transmitting node 102 has insufficient power to contact wirelessly, and thus has to take advantage of a sending a RUM by backhaul connection 114 via a backhaul network 116. As a further example, the interfering node 110 can comprise a femtocell that is closer in proximity to both the transmitting node 102 and receiving node 104 (e.g., the user's own femtocell) than they are to each other. However, the transmitting node 102 does not have authorization to communicate wirelessly with the interfering node 110 in that it lacks proper security authentication keys. Consequently, the transmitting node 102 can advantageously make a RUM request by broadcast 118, which in the illustrative implementation to simplify interpretation of the RUM request can comprise an analog signal corresponding to a desired interference power. In an exemplary aspect, this information can comprise squared factor "R" divided by a desired interference power $R^2/I_{DESIRED}$, where "R" can be a constant or selectively varied to appropriately compensate for the different classes of interfering nodes. Further, sufficient data regarding the path loss, etc., can exist such that the desired interference power can further address this path loss, as well as calibration errors due to mismatch in the uplink and downlink path losses.

In another aspect, each respective interfering node 106, 108, 110 can have a differing nominal interference power $I^W_{NOMINAL}, I^B_{NOMINAL}, I^A_{NOMINAL}$ respectively. This nominal power level need not be the same nor constant, but instead refers to a power level that each node would use but for complying with a reduction request according to the present disclosure. This difference can pertain to transmit power at the respective node 106, 108, 110, predicted or sensed received power at the receiving node 104, or received power at the transmitting node 102. The transmitting node 102 can request a desired interference power $I^W_{DESIRED}, I^B_{DESIRED}, I^A_{DESIRED}$ respectively that is a constant value chosen to be generally or worst-case satisfactory. The requested level can reflect predicted or empirically determined path loss between the transmitting node 102 and interfering node 106, 108, 110, or path loss between the receiving node 104 and the interfering node 106, 108, 110.

The transmitting node 102 advantageously comprises a quantization component 120 for reduced bandwidth requirements to convey the desired interference level, the 'R' value, or a determined path loss 'G'. A desired interference level per frequency channel component 122 advantageously determines what channels are pertinent to the interferer or to the desired transmission in making an appropriate request. An adaptive desired interference component 124 can advantageously vary the requested interference level taking into consideration factors such as relative path loss between the transmitting and interfering nodes 102, 106, 108, 110, between the interfering and receiving nodes 106, 108, 110, 104, or between the transmitting and receiving nodes 102, 104. The adaptive desired interference component 124 can take advantage of combined measurements by a plurality of nodes in gauging path loss. A channel calibration component 126 can advantageously correct for a mismatch in a forward and reverse subjective path loss between the transmitting node 102 and the interfering node 106, 108, 110 due to electronic component losses in the receive and transmit chains.

It should be further appreciated that the transmitting node (Node A) 102 in some instances detects interference without identifying the source of the interference. The Node A 102 can send a general request for reduction in a power level without specific knowledge of receipt and compliance by the interfering node. Alternatively or in addition, the Node A 102 can prospectively announce a desired maximum interference power before actually experiencing interfering transmission. Alternatively or in addition, an eavesdropping node 140 that has not yet made an interfering transmission can overhear the request of the Node A 102 and comply.

It should further be appreciated that the Node A 102 can experience an interference power that results from a plurality of interfering nodes. The Node A 102 can make targeted or general broadcast request(s) so that the combined interference power is below a desired level, or probabilistically expected to be below the desired level. In practice, serving Node A (not depicted) can indicate to nodes such as user equipment (UE) either its total target interference level (either explicitly or implicitly via rate assignment) or target interference level per node. In the former case, a UE can infer target interference per node. Finally, UE can send a resource utilization messages (RUM) with transmit power control $P_{TX\ control}$ set appropriately to achieve the target interference level in certain probabilistic sense. Nodes that receive this RUM can honor it according to provisioned rule. In an instance of a generally broadcast request, a serving Node can attempt to control a macro, total level of interference via a RUM without being cognizant or attentive to interference caused by any particular interferer of the UE.

In another aspect, the Node A 102 can be unable or unwilling to measure interference, choosing to prospectively broadcast its desired interference power. Alternatively or in addition, the Node A 102 can have an indirect indication of interference based upon retransmission requests from Node B 104 or based upon data error rate experienced by the Node A 102 on signals that it is receiving. Alternatively or in addition, the interference can be intermittent such that the Node A 102 is not currently measuring an interfering signal but is prompted to reduce the likelihood that one will occur at a critical time that prevents successful transmission.

By virtue of the forgoing and as described further below, the transmitting node 102 provides for one or more, as well as other advantages, of (1) indicating a quantized value of the constant path loss "G"; (2) putting RUMs with different values of desired interference level on different pieces of bandwidth (e.g., channels), which advantageously amounts to indicating "G" implicitly where the value of transmit power request ($P_{TX\text{-}CONTROL}$) depends on the time-frequency resources used for signaling the interfering node; and (3) calibration such as to serving cell, calibrating to an average of neighboring cells that can fine tune operation. Thereby, an indication of desired interference information is made known to interfering nodes that can cooperatively agree to reduce power if appropriate, decentralizing network optimization and fairness with a "soft" interference response (i.e., not just On-Off response). In some implementations, providing an analog mechanism to indicate $I_{DESIRED}$ making use of channel reciprocity can expand the universe of interfering devices that can cooperate in reducing the impacts to interference.

Figure 2:
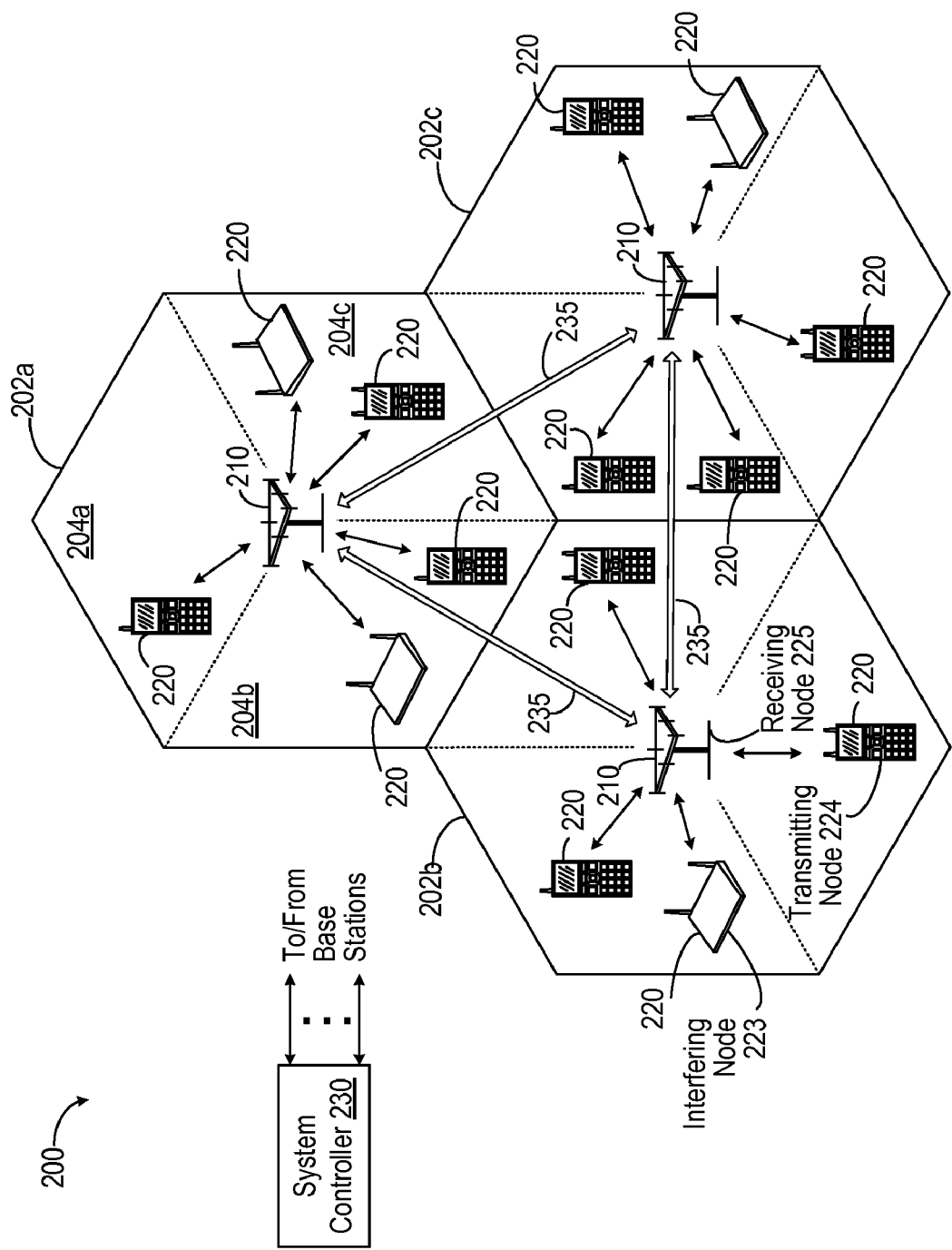
FIG. 2 depicts a block diagram of wireless multiple-access communication system including multiple base stations and multiple terminals.

FIG. 2 is an illustration of a wireless multiple-access communication system 200 in accordance with various aspects. In one example, the wireless multiple-access communication system 200 includes multiple base stations 210 and multiple terminals 220. Further, one or more base stations 210 can communicate with one or more terminals 220. Each of the stations 210 and terminals 220 in proximity to one another can be one of an interfering node, such as depicted at 223, a transmitting node 224 and a receiving node 225 as discussed above. By way of non-limiting example, a base station 210 can be an access point, a Node B, and/or another appropriate network entity. Each base station 210 provides communication coverage for a particular geographic area 202a-c. As used herein and generally in the art, the term "cell" can refer to a base station 210 and/or its coverage area 202a-c depending on the context in which the term is used.

To improve system capacity, the coverage area 202a, 202b, or 202c corresponding to a base station 210 can be partitioned into multiple smaller areas (e.g., areas 204a, 204b, and 204c). Each of the smaller areas 204a, 204b, and 204c can be served by a respective base transceiver subsystem (BTS, not shown). As used herein and generally in the art, the term "sector" can refer to a BTS and/or its coverage area depending on the context in which the term is used. In one example, sectors 204a, 204b, 204c in a cell 202a, 202b, 202c can be formed by groups of antennas (not shown) at base station 210, where each group of antennas is responsible for communication with terminals 220 in a portion of the cell 202a, 202b, or 202c. For example, a base station 210 serving cell 202a can have a first antenna group corresponding to sector 204a, a second antenna group corresponding to sector 204b, and a third antenna group corresponding to sector 204c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 220 can be dispersed throughout the system 200. Each terminal 220 can be stationary or mobile. By way of non-limiting example, a terminal 220 can be an access terminal (AT), a mobile station, user equipment, a subscriber station, and/or another appropriate network entity. A terminal 220 can be a wireless device, a cellular phone, a personal digital assistant (PDA), a wireless modem, a handheld device, or another appropriate device. Further, a terminal 220 can communicate with any number of base stations 210 or no base stations 210 at any given moment.

In another example, the system 200 can utilize a centralized architecture by employing a system controller 230 that can be coupled to one or more base stations 210 and provide coordination and control for the base stations 210. In accordance with alternative aspects, system controller 230 can be a single network entity or a collection of network entities. Additionally, the system 200 can utilize a distributed architecture to allow the base stations 210 to communicate with each other as needed. Backhaul network communication 235 can facilitate point-to-point communication between base stations employing such a distributed architecture. In one example, system controller 230 can additionally contain one or more connections to multiple networks. These networks can include the Internet, other packet based networks, and/or circuit switched voice networks that can provide information to and/or from terminals 220 in communication with one or more base stations 210 in system 200. In another example, system controller 230 can include or be coupled with a scheduler (not shown) that can schedule transmissions to and/or from terminals 220. Alternatively, the scheduler can reside in each individual cell 202, each sector 204, or a combination thereof In an example, system 200 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 220 are orthogonalized by transmitting in different time intervals. FDMA utilizes frequency division multiplexing (FDM), wherein transmissions for different terminals 220 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 200 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 210 and terminals 220 in system 200 can communicate data using one or more data channels and signaling using one or more control channels. Data channels utilized by system 200 can be assigned to active terminals 220 such that each data channel is used by only one terminal at any given time. Alternatively, data channels can be assigned to multiple terminals 220, which can be superimposed or orthogonally scheduled on a data channel. To conserve system resources, control channels utilized by system 200 can also be shared among multiple terminals 220 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 3:
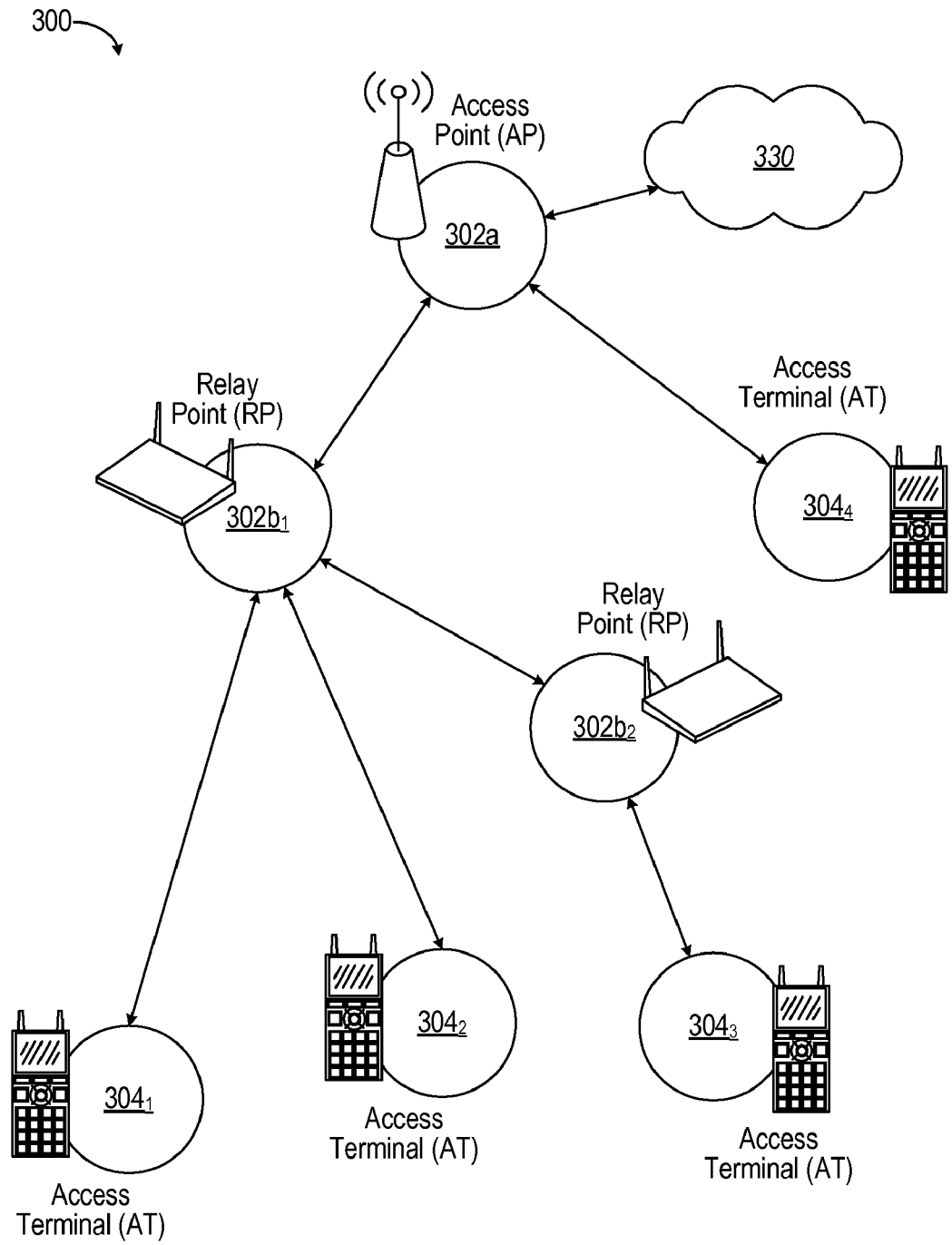
FIG. 3 depicts a wireless network comprised of access nodes, relay nodes, and access terminals.

In FIG. 3, a wireless network 300 is shown with several wireless nodes, generally designated as wireless nodes 302 and access terminals 304. A wireless node may receive, transmit, or both. In the discussion that follows, the term "receiving node" may be used to refer to a wireless node that is receiving and the term "transmitting node" may be used to refer to a wireless node that is transmitting. These designations do not imply that the wireless node is incapable of performing both transmit and receive functions.

A wireless node may function as an access point (AP) or sector, a relay point, an access terminal, or any combination thereof. In the example of a wireless network 300 shown in FIG. 3, a cluster of the wireless nodes 302 function together to provide backhaul services to a number of access terminals 304. The cluster includes a wireless node 302A that functions as an access point by providing a backhaul connection to a network 330 (e.g., a WWAN such as a cellular network, a WLAN, an ISP, the Internet, etc.). This wireless node 302a, however, may function as a relay point for other access points not shown in FIG. 3, or provide a relay function in response to a dynamic reconfiguration of the wireless network 300. The cluster also includes two wireless nodes $302b_1$ and $302b_2$ that function as relay points to connect the access terminals 304 to the access point 302a. Although not shown, these wireless nodes $302b_1$ and $302b_2$ may also provide connectivity to other access points and relay points. The same wireless nodes $302b_1$ and $302b_2$ may function as access points for other clusters of wireless nodes in the network 300.

Four access terminals 304 are shown in FIG. 3. In this example, two access terminals $304_1$ and $304_2$ are connected to the access point 302a through the relay point $302b_1$, one access point $304_3$ is connected to the access point 302A through the relay point $302b_2$, and the remaining access point $304_4$ is connected directly to the access point 302a. An access terminal 304 may be any mobile user device capable of supporting radio communications with a wireless node 302 including, by way of example, a mobile or cellular phone, a personal digital assistant (PDA), a laptop computer, a digital audio device (e.g., an MP3 player), a game console, a digital camera, or other voice, data, audio, video, messaging, or multimedia device. In some applications, the access terminal 304 may also function as an access point and/or relay point for other wireless nodes in the network 300.

Figure 4:
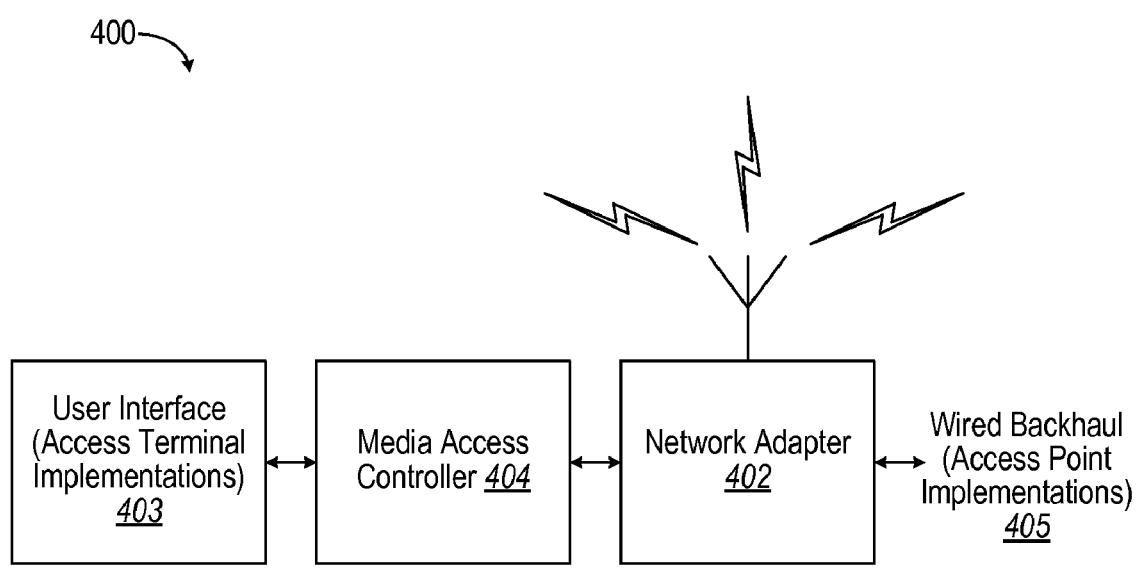
FIG. 4 depicts a block diagram of a functionality of a wireless node.

The air interface specification used or adopted to support the wireless network 300 can be based on any suitable multiple access technology that enables mobile subscribers to share the available radio resources. Examples of such multiple access technologies include Time Division Multiple Access (TDMA), Frequency Division Multiple Access (FDMA), CDMA, Wideband CDMA (W-CDMA), Orthogonal Frequency Division Multiple Access (OFDMA), or some combination thereof FIG. 4 is a block diagram illustrating an example of the functionality of a wireless node 400. The following descriptive is informative in nature and broadly defines the functionality of each block. Only the pertinent functionality to various concepts described throughout this disclosure will be described. Those skilled in the art will recognize that these functional blocks can provide other functionality that is not described herein. In this example, the wireless node 400 includes two functional blocks: a wireless network adapter 402 and a media access controller 404.

The wireless node may be an access point or sector. In a wireless node that serves as an access point, a network adapter 402 maintains a wireless downlink connection with a first node to allow the media access controller 404 to communicate with a second node. The first node may be a relay point and the second node an access terminal, however, other downlink configurations may be supported. The network adapter 402 in the access point also maintains a wired backhaul connection 405 to the network.

The wireless node may be an access terminal In a wireless node that serves as an access terminal, the network adapter 402 maintains a wireless uplink connection with a first node to allow the media access controller 404 to communicate with a second node. A user interface 403 is used to control the content communicated with the second node. The first node may be a relay point and the second node an access point, however, other uplink configurations may be supported.

The functionality of the wireless node described above in connection with an access point and access terminal may be implemented in a relay point. In this configuration, the network adapter 402 may be used to maintain either an uplink or downlink connection with a first node to allow the media access controller 404 to communicate with a second node. By way of example, the network adapter 402 may maintain an uplink connection with another relay point to allow the media access controller 404 to communicate with an access point. Alternatively, or in addition to, the network adapter 402 may maintain a downlink connection with another relay point to allow the media access controller 404 to communicate with an access terminal. As those skilled in the art will appreciate, other uplink and downlink configuration may be supported by the network adapter 402.

The network adapter 402 provides both a receiver function and transmitter function. The receiver function includes demodulating a wireless signal and retrieving content carried by the signal. The transmitting function includes modulating a carrier with content. The wireless network 402 provides various functions such as RF front-end processing, ADC, timing and frequency estimation, channel estimation, turbo coding etc. In summary, the wireless network adapter 402 provides the complete physical layer implementation of the wireless node 102.

The media access controller (MAC) 404 is used to control access to the wireless medium. It uses a scheduling algorithm to accommodate the current functionality of the wireless node (e.g., access point, relay point, access terminal). The media access controller 404 is responsible for scheduling communications between other wireless nodes using the request/grant scheme discussed earlier.

The media access controller 404 may be configured to support the wireless downstream connection maintained by the network adapter 402. In this configuration, the media access controller 404 receives a transmission request from the first node that includes a specified allocation of radio resources. The specified radio resources received in the transmission request from the first node may include frequency assignments, code spreading assignments, and other types of radio resources. The specified radio resources may be from an assignment of radio resources sent earlier by the media access controller 404 to the first node. In response to this request, the media access controller 404 designates at least a portion of the specified radio resources. Alternatively, or in addition to, the media access controller 404 may designate additional radio resources not specified by the first node. The designation may be based on a variety of parameters including, by way of example, quality of service requirements and/or loading. The designated radio resources are communicated to the first node in a grant message.

The media access controller 404 may also be configured to support the wireless upstream connection maintained by the network adapter 402. In this configuration, the media access controller 404 sends to the first node a request to communicate using a specified allocation of radio resources. The specified radio resources received in the transmission request from the first node may include frequency assignments, code spreading assignments, and other types of radio resources. In response to the request, the media access controller 404 receives from the first node a grant to communicate using at least a portion of the specified allocation of radio resources.

Figure 5:
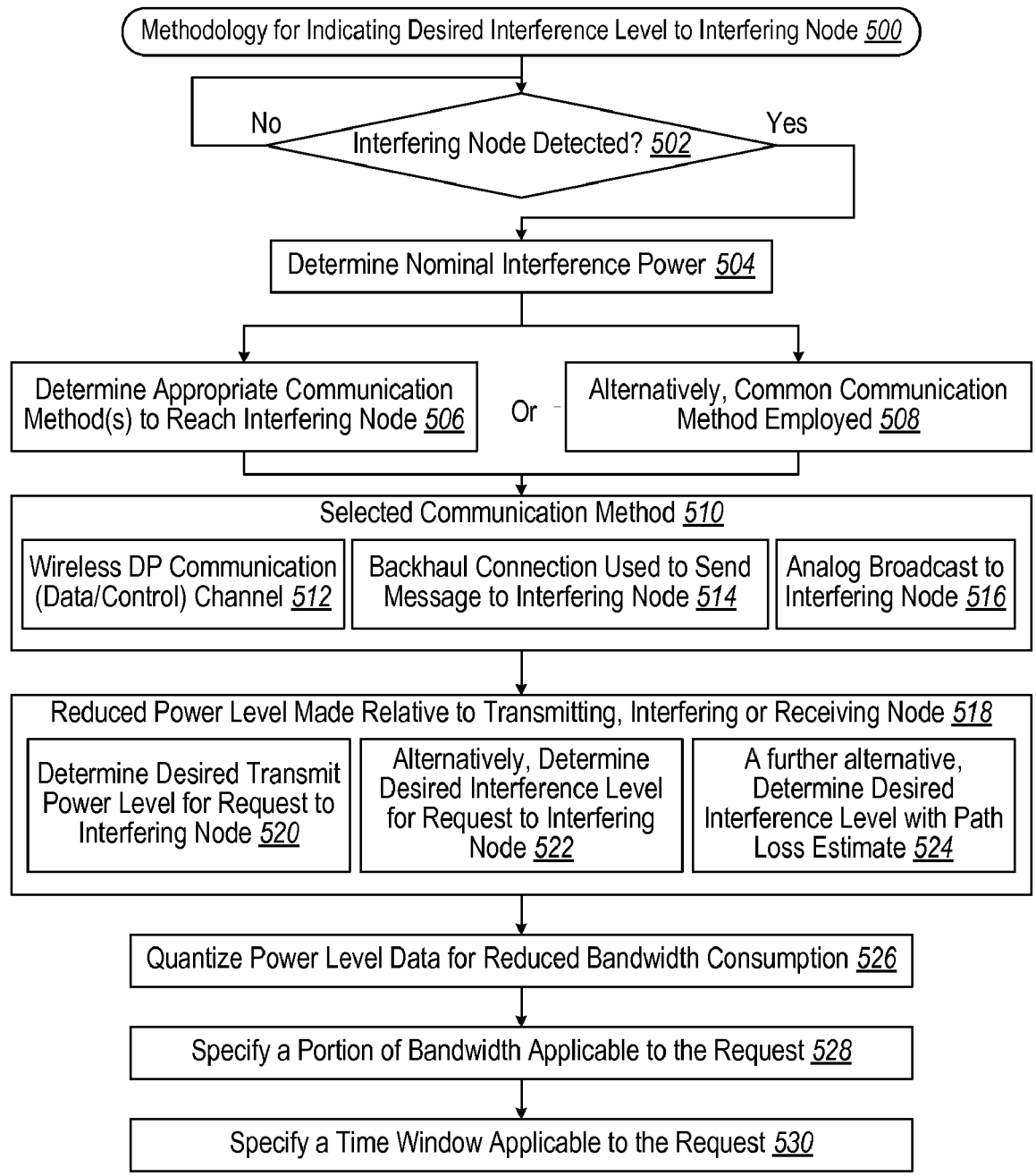
FIG. 5 depicts a flow diagram of a methodology or sequence of operations for indicating a desired interference level with information included in a message sent to the interferer node(s).

In one aspect depicted in FIG. 5, a methodology 500 indicates a desired interference level with information included in a message sent to the interferer node(s). When an interfering node is detected (block 502), a determination is made of what its nominal interference power is (block 504). When an urgent need exists to transmit time critical data to a receiving node that is being interfered with by the interfering node, then in one aspect, the transmitting node can determine one of a plurality of communication methods that can reach the interfering node (block 506). Alternatively, a common approach can be used to reach interfering nodes (block 508). A selected communication method conveys the message to the interfering node to reduce rather than to curtail its power level in order to avoid undue interference (block 510). This message may be sent over the air using a data channel or a special control channel (block 512). Alternatively in addition, the message can be sent to the interferer node(s) over a backhaul connection (block 514), if such connection is available. As a further alternative, the message can be an analog broadcast made with an interfering node that is not in wireless or network communication with the transmitting node (block 516). Depending upon analytical or empirical resources available to the transmitting node, a value that is sent by message to the interfering node can be made relative to the transmitting node, the interfering node or the receiving node (block 518). The message may include, for example, a transmit power recommendation that the interferer node may use (block 520). Alternately, the message may include a desired interference level (block 522). In one aspect, the interferer may then determine an appropriate transmit power based on the desired interference and an estimate of the path loss to the requesting node (block 524). In the above messages, the information about desired interference or desired transmit power may be quantized appropriately to save bits, as indicated at 526. In block 528, the request of the interfering node for reduced transmit power can specify a portion of a frequency bandwidth that is applicable for the power reduction. In block 530, the request of the interfering node for reduced transmit power can specify a time window or duration that is applicable for the power reduction.

Figure 6:
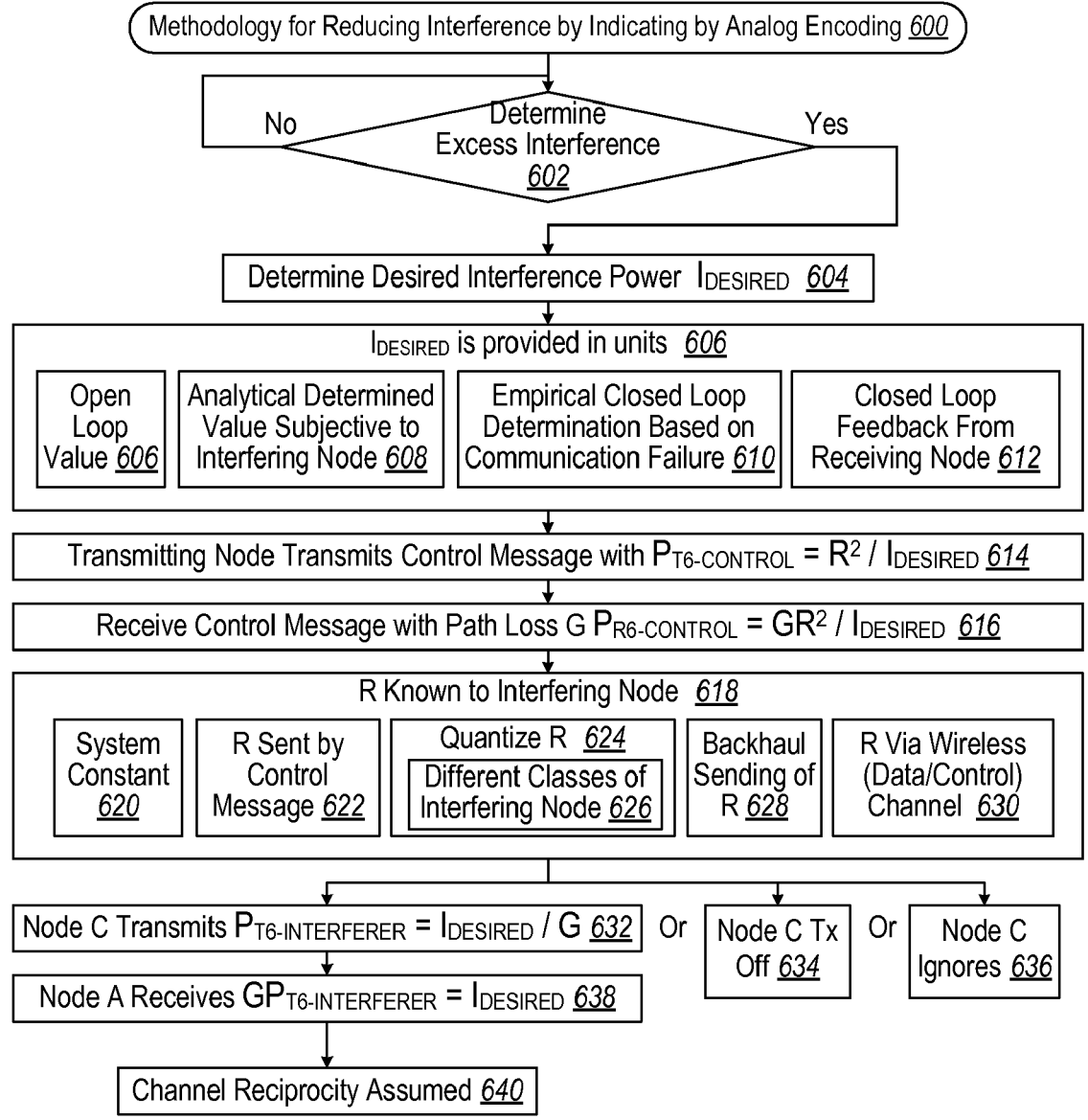
FIG. 6 depicts a flow diagram of a methodology or sequence of operations for reducing interference by indicating desired transmit power to an interfering node by an analog encoding.

In another aspect depicted in FIG. 6, a methodology 600 is provided for reducing interference by indicating desired transmit power to an interfering node by an analog encoding. If node A sees excessive interference from Node C (and possibly other nodes) that exceeds a desired interference level $I_{DESIRED}$ (block 602), then Node A determines, for example, to see an interference level of $I_{DESIRED}$ instead. In this aspect, $I_{DESIRED}$ is provided in units (block 604). This desired interference level $I_{DESIRED}$ can be an open-loop value (block 606). Alternatively, this interference level of $I_{DESIRED}$ can be determined analytically based upon data or assumptions (e.g., spacing, channel quality reports, target data rate etc.) regarding the path losses between Node A and Node B, between Node C and Node A, and between Node C and Node B. Node A thereby determines that interference level of $I_{DESIRED}$ can be overcome by the transmitted power of Node A (block 608). Alternatively, this $I_{DESIRED}$ threshold can be determined empirically for levels at which Node B (receiving node) is capable of receiving the transmission from Node A with an acceptable block error rate (BER) (block 610). As a further alternative, this information can also be included in signaling from the receiving node (block 612).

In an illustrative aspect, Node A (transmitting node) transmits a control message with a transmit power $P_{TX\text{-}CONTROL}=R^2/I_{DESIRED}$ to Node C (block 614). Thus, node A wishes to see an interference of $I_{DESIRED}$ (in units of power, e.g. milliwatts) and R is a number (also in units of power). In block 616, given that G is the path loss between node A and node C, then Node C (interfering node) receives this control message at power $P_{RX\text{-}CONTROL}=GR^2/I_{DESIRED}$. Assume R is known to node C (block 618). This may be the case if R is a system-wide constant, for example (block 620). In one aspect, information about R may be included in the control message (block 622). The information may be quantized appropriately, for example (block 624). This may be useful in distinguishing between different power classes of transmitters (such as a femtocell and a macro cell) (block 626). In another aspect, information about R may be sent to node C over the backhaul (block 628) or over the air via a different control or data channel (block 630). Node C may then choose to transmit at power $P_{TX\text{-}INTERFERER}=R^2/P_{RX\text{-}CONTROL}=R^2/(GR^2/I_{DESIRED})=I_{DESIRED}/G$ (block) 632). Alternatively as depicted at block 634, node C may choose to not transmit, if it believes $P_{TX\text{-}INTERFERER}$ is not sufficient to sustain transmission to its receiver at a desired spectral efficiency. In another alternate aspect, Node C may also choose to disregard the message regardless of whether there is an impact upon its transmissions (block 636). If choosing to comply, the transmission from Node C is received at Node A at $GP_{TX\text{-}INTERFERER}=I_{DESIRED}$ (block 638). In one aspect, the channel reciprocity is assumed, i.e., the channel gain on the control link and the data link is equal to G (block 640). Thus, it should be appreciated with the benefit of the present disclosure that the methodology 600 ensures that node A receives its desired interference from node C.

Figure 7:
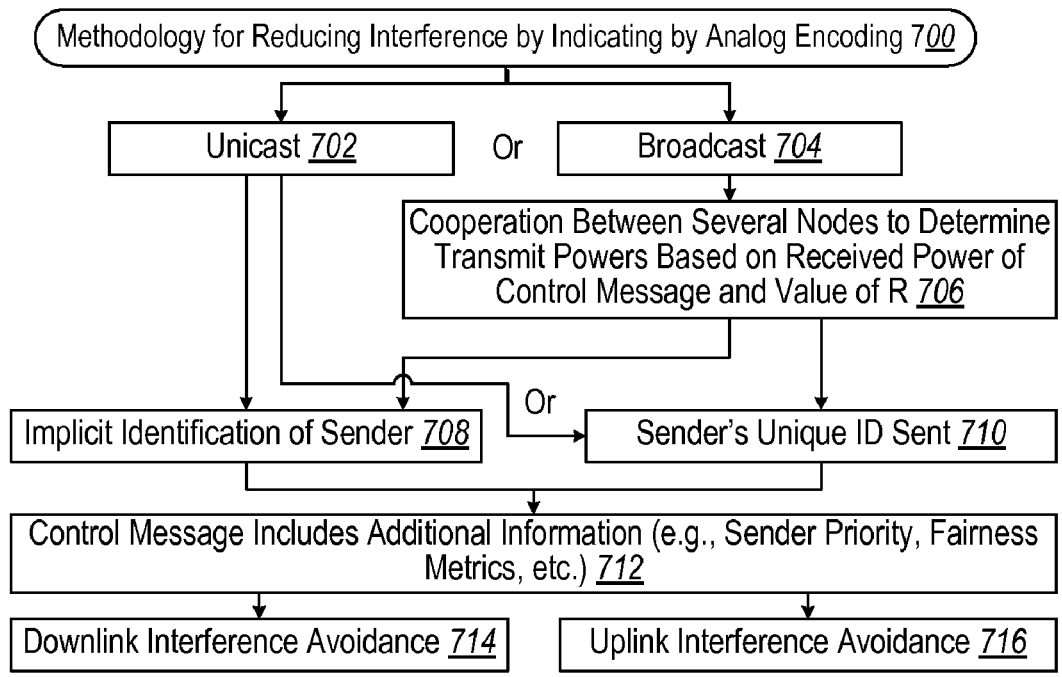
FIG. 7 depicts a flow diagram of a methodology or sequence of operations is provided for encoding of the reduced power level to the interfering node in a message along with other information.

In FIG. 7, in one aspect, a methodology 700 is provided for encoding of the reduced power level to the interfering node (e.g., $I_{DESIRED}$) along with additional information. The control message mentioned above may be a unicast signal (block 702) or, in the alternative, a broadcast signal (block 704). In the latter case, several nodes in the network may determine their transmit powers based on the level at which they receive the control message and the value of R, which may be encoded in a digital fashion within the message (block 706). In some aspects, there may not be any need to identify the sender of the message explicitly (block 708). In other aspects, a hash of the sender's unique identifier may be included in the message to help receivers (partly) identify the sender and determine their response (block 710). The control messages may include other information such as sender priority, fairness metrics, etc. (block 712) The control messages may be sent on the uplink (for downlink interference avoidance) (block 714) or the downlink (for uplink interference avoidance) (block 716).

Figure 8:
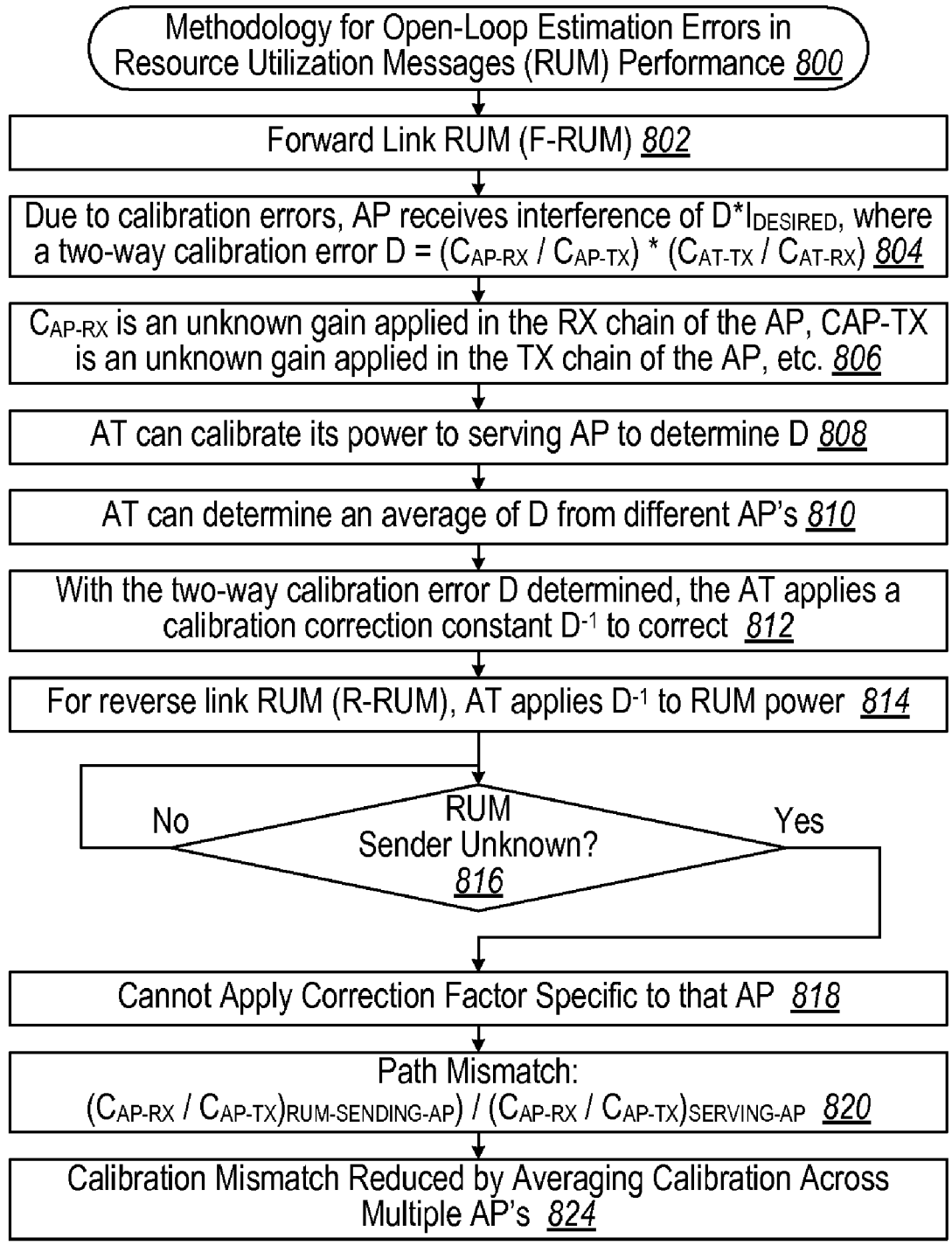
FIG. 8 depicts a flow diagram of a methodology or sequence of operations that addresses open-loop estimation errors in resource utilization messages (RUM) performance.

In the aforementioned system, it is assumed that the path loss on both links is the same. This may not always be the case due to calibration errors, differing fades on the links etc. Thus, in one aspect, a control message required $I_{DESIRED}$ may result in an interference of D $I_{DESIRED}$, where D is a value that depends on channel mismatch, calibration errors etc. A "calibration mechanism" may be introduced to determine D and correct for it either in the control message transmit power or in the interferer response. To that end, in FIG. 8, a methodology 800 addresses open-loop estimation errors in resource utilization messages (RUM) performance. Consider a forward link RUM (F-RUM) (block 802), although similar application can be applied to a reserve link RUM (R-RUM). In an ideal scenario, an access point (AP) sending RUM at $P_C^2/I_{DESIRED}$ receives interference $I_{DESIRED}$ from an access terminal (AT) responding to the RUM. Due to calibration errors, AP receives interference of $D*I_{DESIRED}$, where a two-way calibration error $D=(C_{AP-RX}/C_{AP-TX})*(C_{AT-TX}/C_{AT-RX})$ (block 804). $C_{AP-RX}$ is an unknown gain applied in the RX chain of the AP, CAP-TX is an unknown gain applied in the TX chain of the AP, etc. (block 806) Advantageously, the AT can calibrate its power to serving AP to determine D (block 808). In particular, in some instances or implementations the AT can determine an average of D from different AP's (block 810). With the two-way calibration error D determined, the AT applies a calibration correction constant $D^{-1}$ to correct for this (block 812). For reverse link RUM (R-RUM), the AT can apply $D^{-1}$ to RUM power (block 814).

With regard to a further aspect of calibration errors, consider when a RUM sender is unknown (block 816), and thus cannot apply a correction factor specific to that AP (block 818). A mismatch can this situation can be described as $(C_{AP-RX}/C_{AP-TX})_{RUM-SENDING-AP})/(C_{AP-RX}/C_{AP-TX})_{SERVING-AP}$ (block 820). This calibration mismatch can be reduced by averaging calibration across multiple AP's (block 824).

Figure 9:
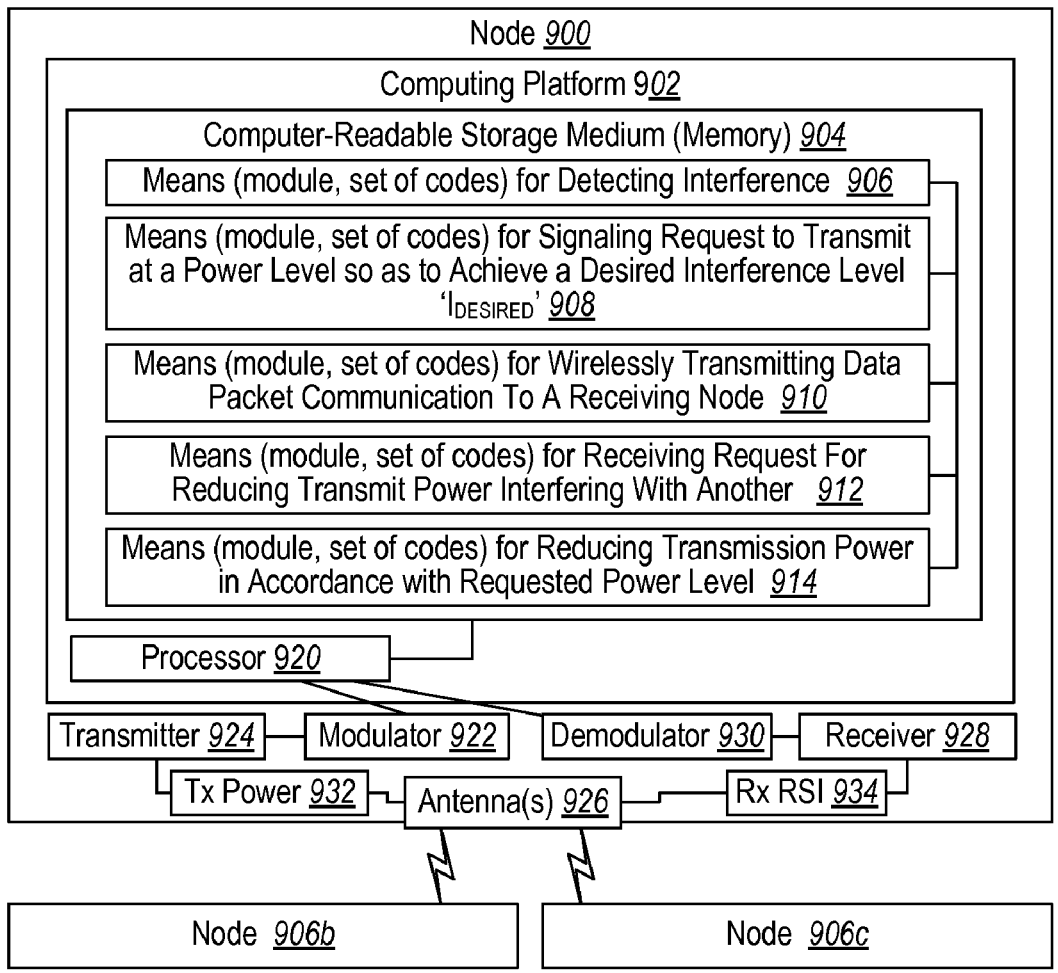
FIG. 9 depicts a block diagram of a node having a computing platform for performing methods for requesting reduced interference power.

In FIG. 9, a node 900a determines that it is unable to successfully transmit to another node 900b and thus can signal to an additional node 900c to request a reduced transmission power level to lower interference without a loss of communication capacity for a wireless communication network 901. In addition, the node 900a can respond to a request from nodes 900b, 900c to reduce its transmit power to enable them to successfully complete transmissions. To that end, the node 900a has a computing platform 902 that provides means such as sets of codes for causing a computer to perform interference mitigation. In particular, the computing platform 902 includes a computer readable storage medium (e.g., memory) 904 that stores a plurality of modules 906-914 executed by a processor(s) 920. A modulator 922 controlled by the processor 920 prepares a downlink signal for modulation by a transmitter 924, radiated by antenna(s) 926. A receiver 928 receives uplink signals from the antenna(s) 926 that are demodulated by a demodulator 930 and provided to the processor 920 for decoding. A transmit power component 932 can adjust a transmit power for purposes such as interference mitigation. A received signal indicator (RSI) 934 measures received signal strength for gauging interference power and path loss. In particular, a means (e.g., module, set of codes) 906 is provided for detecting interference from an interfering node. Means (e.g., module, set of codes) 908 is provided for signaling a request that is received by the interfering node to transmit at a power level so as to achieve a desired interference level. Means (e.g., module, set of codes) 910 is provided for wirelessly transmitting data packet communication to a receiving node. Means (e.g., module, set of codes) 912 is provided for receiving a request for reducing transmit power interfering with a transmission of another node. Means (e.g., module, set of codes) 914 is provided for reducing transmission power in accordance with a requested power level.

Figure 10:
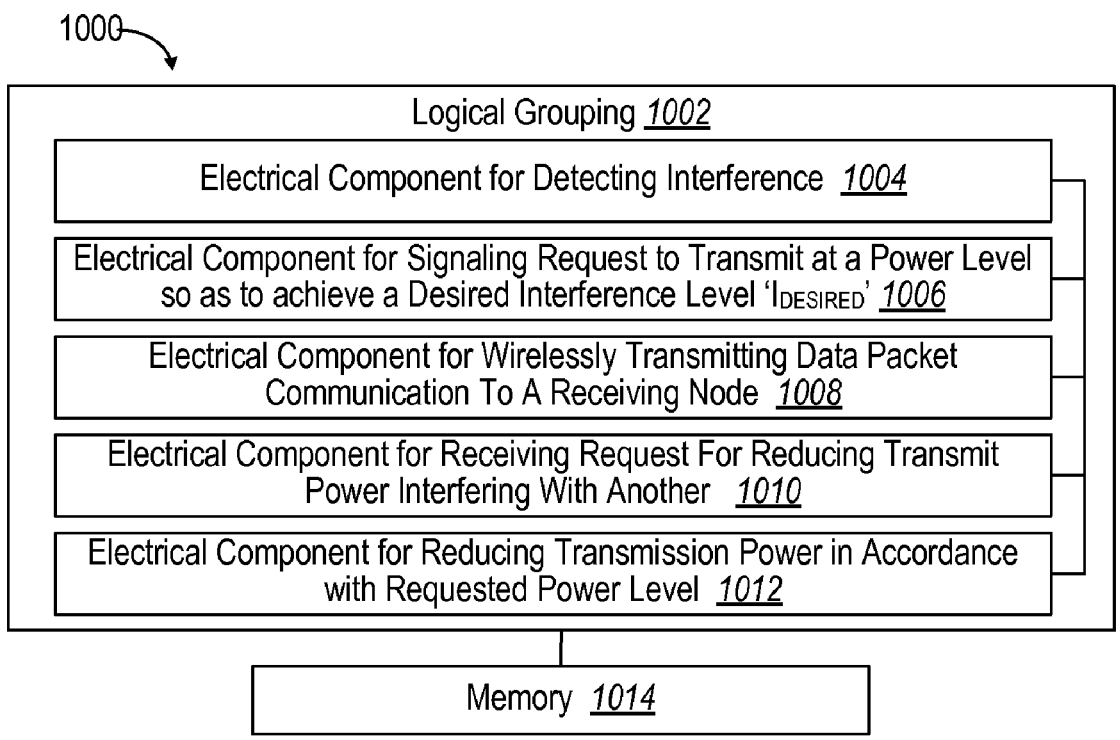
FIG. 10 illustrates a block diagram of a system having a logical grouping of electrical components for performing interference mitigation.

With reference to FIG. 10, illustrated is a system 1000 that enables interference mitigation. For example, system 1000 can reside at least partially within user equipment (UE). It is to be appreciated that system 1000 is represented as including functional blocks, which can be functional blocks that represent functions implemented by a computing platform, processor, software, or combination thereof (e.g., firmware). System 1000 includes a logical grouping 1002 of electrical components that can act in conjunction. For instance, logical grouping 1002 can include an electrical component for detecting interference from an interfering node 1004. Moreover, logical grouping 1002 can include an electrical component for signaling a request received by the interfering node to transmit at a power level so as to achieve a desired interference level 1006. Further, logical grouping 1002 can include an electrical component for wirelessly transmitting data packet communication to a receiving node 1008. Logical grouping 1002 can include an electrical component for receiving a request for reducing transmit power interfering with a transmission of another node 1010. Logical grouping 1002 can include an electrical component for receiving a request for reducing transmit power interfering with a transmission of another node 1012. Additionally, system 1000 can include a memory 1014 that retains instructions for executing functions associated with electrical components 1004-1012. While shown as being external to memory 1014, it is to be understood that one or more of electrical components 1004-1012 can exist within memory 1014.

While the specification describes particular examples of the present invention, those of ordinary skill can devise variations of the present invention without departing from the inventive concept. For example, the teachings herein refer to circuit-switched network elements but are equally applicable to packet-switched domain network elements.

For example, the exemplary aspects discussed above can be implemented with nodes that can reciprocate in playing the role of a transmitting node in one instance and then playing the role of an interfering node in another. Further, fairness can be meted out in relation to receptivity of a node to favorably respond to a reduced transmit power request. Alternatively, a node can only be provisioned to act as a selected one of a transmitting node and an interfering node.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for wireless communication, comprising:
signaling a request that is received by a interfering node to transmit at a power level so as to achieve a desired interference level;
wirelessly transmitting data packet communication to a receiving node;
signaling a request received by the interfering node to transmit at a desired interference level $I_{DESIRED}$ by sending a transmit power request $P_{TX\text{-}CONTROL} = R^2 / I_{DESIRED}$ that is received with a path loss 'G' and wherein 'R' is a numeric reference value; and
receiving an interference transmission from the interfering node transmitted at power $P_{TX\text{-}INTERFERER} = R^2 / P_{RX\text{-}CONTROL} = R^2 / (G\ R^2 / I_{DESIRED}) = I_{DESIRED} / G$.

2. The method of claim 1, further comprising detecting interference from the interfering node.

3. The method of claim 1, further comprising:
provisioning the interfering node with the numeric reference value 'R'.

4. The method of claim 1, further comprising indicating a quantized value for the path loss 'G' to the interfering node.

5. The method of claim 1, wherein a value of the transmit power request $P_{TX\text{-}CONTROL}$ depends on the time-frequency resources used for signaling the interfering node.

6. The method of claim 1, further comprising quantizing the value R.

7. The method of claim 1, further comprising defining a system constant value R.

8. The method of claim 1, further comprising transmitting the value R by backhaul communication.

9. The method of claim 1, further comprising transmitting the value R as on a wireless data or control channel.

10. The method of claim 1, further comprising transmitting the value R as part of control message comprising the desired interference level.

11. The method of claim 1, further comprising determining the value R in accordance to a class of node of a heterogeneous network.

12. The method of claim 2, further comprising reducing two-way path loss calibration error by determining a desired interference level by combining information on received interference at a plurality of nodes.

13. The method of claim 2, further comprising quantizing the desired interference level for reduced signaling bandwidth.

14. The method of claim 2, further comprising:
determining a calibration error due to a receiver chain gain and a transmitter chain gain for a wireless link.

15. The method of claim 2, further comprising signaling the request to transmit at a power level so as achieve a desired interference level by signaling the desired interference level.

16. The method of claim 2, further comprising signaling the desired interference level as a transmit power level at the interfering node.

17. The method of claim 2, further comprising transmitting a transmission adjustment factor in the request in addition to the desired interference level.

18. The method of claim 17, further comprising transmitting fairness metric.

19. The method of claim 2, further comprising specifying time duration for the request.

20. The method of claim 2, further comprising signaling the request by wireless data packet channel.

21. The method of claim 2, further comprising signaling the request by one of a control channel and a data channel.

22. The method of claim 2, further comprising signaling the interfering node by backhaul communication.

23. The method of claim 2, further comprising signaling the request by analog broadcast.

24. The method of claim 2, further comprising signaling the request to transmit at a desired interference level for a specified channel.

25. The method of claim 2, further comprising signaling the request to transmit at a desired interference level for a specified period of time.

26. The method of claim 2, further comprising detecting interference caused by a plurality of interfering nodes.

27. The method of claim 26, further comprising transmitting the request to a specific interfering node to reduce its transmit power so that the total interference does not exceed the desired interference level.

28. The method of claim 26, further comprising broadcasting the request so that the plurality of interfering nodes will reduce their transmit power.

29. The method of claim 26, further comprising performing a probabilistic analysis that the requested power level will achieve the desired interference level.

30. At least one processor for wireless communication, comprising:
a first module for signaling a request that is received by an interfering node to transmit at a desired interference level $I_{DESIRED}$ by sending a transmit power request $P_{TX-CONTROL}=R^2/I_{DESIRED}$ that is received with a path loss 'G' and wherein 'R' is a numeric reference value;
a second module for wirelessly transmitting data packet communication to a receiving node; and
a third module for receiving an interference transmission from the interfering node transmitted at power $P_{TX-INTERFERER}=R^2/P_{RX-CONTROL}=R^2/(G R^2/I_{DESIRED}) =I_{DESIRED}/G$.

31. A computer program product for wireless communication, comprising:
a non-transitory computer-readable storage medium comprising,
a first set of codes for causing a node to signal a request that is received by the interfering node to transmit at a power level so as to achieve a desired interference level;
a second set of codes for causing the node to wirelessly transmit data packet communication to a receiving node;
a third set of codes for causing the node to signal a request received by the interfering node to transmit at a desired interference level $I_{DESIRED}$ by sending a transmit power request $P_{TX-CONTROL}=R^2/I_{DESIRED}$ that is received with a path loss 'G' and wherein 'R' is a numeric reference value; and
a fourth set of codes for causing the node receiving an interference transmission from the interfering node transmitted at power $P_{TX-INTERFERER}=R^2/P_{RX-CONTROL}=R^2(G R^2/I_{DESIRED}) =I_{DESIRED}/G$.

32. An apparatus for wireless communication, comprising:
means for signaling a request received by the interfering node to transmit at a power level so as to achieve a desired interference level;
means for wirelessly transmitting data packet communication to a receiving node;
means for signaling a request received by the interfering node to transmit at a desired interference level $I_{DESIRED}$ by sending a transmit power request $P_{TX-CONTROL}=R^2/I_{DESIRED}$ that is received with a path loss 'G' and wherein 'R' is a numeric reference value; and
means for receiving an interference transmission from the interfering node transmitted at power $P_{TX-INTERFERER}=R^2/P_{RX-CONTROL}=R^2(G R^2/I_{DESIRED}) =I_{DESIRED}/G$.

33. An apparatus for wireless communication, comprising:
a computing platform for signaling a request received by an interfering node to transmit at a power level so as to achieve a desired interference level $I_{DESIRED}$ by sending a transmit power request $P_{TX-CONTROL}=R^2/I_{DESIRED}$ that is received with a path loss 'G' and wherein 'R' is a numeric reference value;
a transmitter for wirelessly transmitting data packet communication to a receiving node; and
a receiver for receiving an interference transmission from the interfering node transmitted at power $P_{TX-INTERFERER}=R^2/P_{RX-CONTROL}R^2/(G R^2/I_{DESIRED}) =I_{DESIRED}/G$.

34. The apparatus of claim 33, further comprising a receiver for detecting interference from the interfering node.

35. The apparatus of claim 33, wherein the interfering node is provisioned with the numeric reference value 'R'.

36. The apparatus of claim 33, wherein the computing platform is further for indicating a quantized value for the path loss 'G' to the interfering node.

37. The apparatus of claim 36, wherein a value of transmit power request $P_{TX-CONTROL}$ depends on the time-frequency resources used for signaling the interfering node.

38. The apparatus of claim 33, wherein the computing platform is further for quantizing the value R.

39. The apparatus of claim 33, wherein the computing platform is further for defining a system constant value R.

40. The apparatus of claim 33, wherein the computing platform is further for transmitting the value R by backhaul communication.

41. The apparatus of claim 33, wherein the transmitter is further for transmitting the value R as on a wireless data or control channel.

42. The apparatus of claim 33, wherein the transmitter is further for transmitting the value R as part of control message comprising the desired interference level.

43. The apparatus of claim 33, wherein the computing platform is further for determining the value R in accordance to a class of node of a heterogeneous network.

44. The apparatus of claim 34, wherein the computing platform is further for reducing two-way path loss calibration error by determining a desired interference level by combining information on received interference at a plurality of nodes.

45. The apparatus of claim 33, wherein the computing platform is further for quantizing the desired interference level for reduced signaling bandwidth.

46. The apparatus of claim 34, wherein the computing platform is further for determining a calibration error due to a receiver chain gain and a transmitter chain gain for a wireless link.

47. The apparatus of claim 33, wherein the computing platform is further for signaling the request to transmit at a power level as to as to achieve a desired interference by signaling the desired interference level.

48. The apparatus of claim 33, wherein the computing platform is further for signaling the desired interference level as a transmit power level at the interfering node.

49. The apparatus of claim 33, wherein the transmitter is further for transmitting a transmission adjustment factor in the request in addition to the desired interference level.

50. The apparatus of claim 49, wherein the transmitter is further for transmitting fairness metric.

51. The apparatus of claim 33, wherein the computing platform is further for specifying time duration for the request.

52. The apparatus of claim 33, wherein the computing platform is further for signaling the request by wireless data packet channel.

53. The apparatus of claim 33, wherein the computing platform is further for signaling the request by one of a control channel and a data channel.

54. The apparatus of claim 33, wherein the computing platform is further for signaling the request by backhaul communication.

55. The apparatus of claim 33, wherein the computing platform is further for signaling the request by analog broadcast.

56. The apparatus of claim 33, wherein the computing platform is further for signaling the request to transmit at a desired interference level for a specified channel.

57. The apparatus of claim 33, wherein the computing platform is further for signaling the request to transmit at a desired interference level for a specified period of time.

58. The apparatus of claim 33, wherein the computing platform is further for detecting interference caused by a plurality of interfering nodes.

59. The apparatus of claim 58, wherein the computing platform is further for transmitting the request to a specific interfering node to reduce its transmit power so that the total interference does not exceed the desired interference level.

60. The apparatus of claim 58, wherein the computing platform is further for broadcasting the request so that the plurality of interfering nodes will reduce their transmit power.

61. The apparatus of claim 58, wherein the computing platform is further for performing a probabilistic analysis that the requested power level will achieve the desired interference level.

62. A method for wireless communication, comprising:
receiving a transmit power request, $P_{TX\text{-}CONTROL}=R^2/I_{DESIRED}$, from a second node for reducing transmit power to a third-party node that is interfering with a transmission by the second node, wherein the transmit power request is received with a path loss 'G' and wherein 'R' is a numeric reference value;
reducing transmission power in accordance with a requested power level $I_{DESIRED}$; and
transmitting an interfering transmission received by the first node at power $P_{TX\text{-}INTERFERER}=R^2/P_{RX\text{-}CONTROL}=R^2/(G\ R^2/I_{DESIRED})=I_{DESIRED}/G$.

63. The method of claim 62, further comprising:
determining that the requested transmit power level is inadequate for successful transmission to the third-party node; and
delaying transmission rather than reducing transmission power to enable the second node to complete its transmission.

64. The method of claim 62, further comprising:
determining that the requested transmit power level is inadequate; and
continuing transmission without reducing transmission power as requested.

65. At least one processor for wireless communication, comprising:
a first module receiving a transmit power request, $P_{TX\text{-}CONTROL}=R^2/I_{DESIRED}$, from a second node for reducing transmit power to a third-party node that is interfering with a transmission by the second node, wherein the transmit power request is received with a path loss 'G' and wherein 'R' is a numeric reference value; and
a second module for reducing transmission power in accordance with a requested power level $I_{DESIRED}$, and for transmitting an interfering transmission received by the first node at power $P_{TX\text{-}INTERFERER}=R^2\ P_{RX\text{-}CONTROL}=R^2(G\ R^2/I_{DESIRED})=I_{DESIRED}/G$.

66. A computer program product for wireless communication, comprising:
a non-transitory computer-readable storage medium comprising,
a first set of codes for causing a node to receive a transmit power request, $P_{TX\text{-}CONTROL}=R^2/I_{DESIRED}$, from a second node for reducing transmit power to a third-party node that is interfering with a transmission by the second node, wherein the transmit power request is received with a path loss 'G' and wherein 'R' is a numeric reference value; and
a second set of codes for causing the node to reduce transmission power in accordance with a requested power level $I_{DESIRED}$, and to transmit an interfering transmission received by the first node at power $P_{TX\text{-}INTERFERER}=R^2/P_{RX\text{-}CONTROL}=R^2/(G\ R^2/I_{DESIRED})=I_{DESIRED}/G$.

67. An apparatus for wireless communication, comprising:
means for receiving a transmit power request, $P_{TX\text{-}CONTROL}=R^2/I_{DESIRED}$, from a second node for reducing transmit power to a third-party node that is interfering with a transmission by the second node, wherein the transmit power request is received with a path loss 'G' and wherein 'R' is a numeric reference value; and
means for reducing transmission power in accordance with a requested power level $I_{DESIRED}$, and for transmitting an interfering transmission received b the first node at power $P_{TX\text{-}INTERFERE}=R^2/P_{RX\text{-}CONTROL}=R^2/(G\ R^2/I_{DESIRED})=I_{DESIRED}/G$.

68. An apparatus for wireless communication, comprising:
a receiver for receiving a transmit power request, $P_{TX\text{-}CONTROL}=R^2/I_{DESIRED}$, from a second node for reducing transmit power to a third-party node that is interfering with a transmission by the second node, wherein the transmit power request is received with a path loss 'G' and wherein 'R' is a numeric reference value; and
a computing platform for reducing transmission power in accordance with a requested power level $I_{DESIRED}$, and for transmitting an interfering transmission received by the first node at power $P_{TX\text{-}INTERFERER}=R^2/P_{RX\text{-}CONTROL}=R^2/(G\ R^2/I_{DESIRED})=I_{DESIRED}/G$.

69. The apparatus of claim 68, wherein the computing platform is further for determining that the requested transmit power level is inadequate for successful transmission to the third-party node, and for delaying transmission rather than reducing transmission power to enable the second node to complete its transmission.

70. The apparatus of claim 68, wherein the computing platform is further for determining that the requested transmit power level is inadequate, and for continuing transmission without reducing transmission power as requested.

* * * * *